United States Patent [19]

Oelsner

[11] Patent Number: 5,190,785
[45] Date of Patent: Mar. 2, 1993

[54] METHOD FOR THE MANUFACTURE OF PECTINOUS AND SACCHARIFEROUS PREPARATIONS, SUCH AS JAM, MARMALADE OR THE LIKE

[76] Inventor: Manfred Oelsner, Windmühlenweg 39, D-2000 Hamburg 52, Fed. Rep. of Germany

[21] Appl. No.: 710,064

[22] Filed: Jun. 4, 1991

[30] Foreign Application Priority Data

Jun. 13, 1990 [DE] Fed. Rep. of Germany ....... 4018915
Jun. 19, 1990 [EP] European Pat. Off. ......... 90111590.7

[51] Int. Cl.$^5$ .............................................. A23L 1/064
[52] U.S. Cl. .................................... 426/577; 426/639; 426/400
[58] Field of Search ............... 426/577, 103, 615, 400, 426/639

[56] References Cited

U.S. PATENT DOCUMENTS

| | | | |
|---|---|---|---|
| 4,501,763 | 2/1985 | Yuguchi et al. | 426/577 |
| 4,562,085 | 12/1985 | Ruggiero | 426/577 |
| 5,075,124 | 12/1991 | Horie et al. | 426/577 |

FOREIGN PATENT DOCUMENTS

| | | | |
|---|---|---|---|
| 3838366 | 5/1990 | Fed. Rep. of Germany | 426/577 |
| 2529445 | 1/1984 | France | 426/577 |
| 728752 | 11/1974 | U.S.S.R. | 426/577 |

Primary Examiner—Jeanette Hunter
Attorney, Agent, or Firm—Anderson Kill Olick & Oshinsky

[57] ABSTRACT

For the manufacture of jams and marmalades one proceeds in that, from the charged products of fruit, glucose syrup or crystallized sugar, a component of fruit and glucose syrup which is smaller in comparison with the total quantity of charged products, is removed and boiled down separately for concentration, while the remaining component of charged products from the larger percentage of fruit and sugar is mixed with powdered or aqueous pectin and, in dependence of the solubility of the pectins, the separately inspissated component is mixed with the remaining component of fruit and sugar and the mixture is heated under pressure or vacuum to from 95° C. to 110° C. and, subsequent to the addition of an acid at gelatinization temperature, the product is filled into jars or the like.

16 Claims, No Drawings

METHOD FOR THE MANUFACTURE OF PECTINOUS AND SACCHARIFEROUS PREPARATIONS, SUCH AS JAM, MARMALADE OR THE LIKE

BACKGROUND OF THE INVENTION

The present invention relates to a method for the manufacture of pectinous and sacchariterous preparations, more particularly from fresh fruit or fruit that has been kept fresh and which is stoned or deseeded or cored, fruit flesh, fruit pulps or fruit purees or pastes, such as jam, marmalade or the like. The boiling down of jams, jellies and marmalades from fruit, sugar, pectin and fruit acid is known. Flavor and consistency as well as the conservation and distribution of the fruit essentially determine the quality characteristics of jams, jellies and marmalades. These properties do, however, depend very greatly on the raw materials employed in each case. The characteristic quality of the finished product is imparted by the addition of saccharine substances, pectin and fruit acid. Stone fruit, pomaceaous fruit and berries in a suitable condition are used for the manufacture of jams and marmalades. Refined sugar or white sugar in the form of saccharine solutions which are distinguished by a relatively low viscosity are mainly used for the manufacture of jams; they are temperature-tolerant and do not crystallize out even at a low temperature. Besides sugar, glucose syrup is used for the manufacture of jams and marmalades as well as also üectin and fruit acid, where, especially in the multi-component systems, the pectin plays the structure-imparting part and is used in the quantity necessary in each case for gelatinization. As fruit acids, inter alia lactic acid, citric acid, tartaric acid and the like are employed which serve to standardize in each case the most favorable pH value, particularly since the most favorable pH value for gel formation lies at 3.0. The standardization of the optimal pH value for the gelatinization process in the manufacture of jams and marmalades is effected precisely by the addition of this fruit acid.

Jams and marmalades are manufactured by the boiling process through which an adequate sugar exchange is achieved between the liquid medium and the fruit in order to prevent an emersion in the finished product during storage. The most widely varying cooking vats have been developed for the industrial production of jams and marmalades, where, two types of inspissation principles are distinguished, viz. boiling down in an open vat under atmospheric pressure and boiling down in a closed vacuum vat at reduced pressure. The manufacture of jams and marmalades in an open vat is still practised in but a few, often small manufacturing establishments. In the first-mentioned process, only the fruit and the mixture of pectin and sugar is first heated to from 80° C. to 90° C. and maintained at this temperature for approximately 5 to 10 minutes. The pectins dissolve. It is the object of the process to dissolve the powdered pectins and to carry out the dissolution process at low temperatures so as to conserve the fruit. However, by way of an alternative, the dissolution of the pectins is also effected by means of a brief ebullition lasting approximately 2 minutes at 100° C. to 102° C. But both steps have disadvantages in that the inevitable and also intended steaming is deleterious to the flavor.

However, in the aforementioned known method, the flavor is exposed in an "unprotected" manner to heating and evaporation. On the other hand, boiling down in the vacuum vat at a reduced pressure has gained ground. In the second boiling process mentioned, to begin with the fruit and the added sugar are heated to 70° C. or 95° C. and intermixed with the aid of appropriate agitators. The preheated mixture of fruit and sugar is then aspirated by the preheater with the aid of a vacuum into the actual cooking vat and concentrated by evaporation in the vacuum while steam is supplied under agitation. The pectin solution is then charged and the concentration by evaporation is continued until the desired final solids are obtained; then, the charging of the acid is carried out, in which case the finished product is filled into receptacles within a temperature range of approximately 75° C. to 85° C. In the vacuum boiling process, however, the boiling down is effected in closed cooking vats under reduced pressure. In this process, the operation is carried out at low boiling temperatures and while use is being made of short boiling times, a significant economy of the method is supposed to result. In this process, too, a preheater is operated which is installed before the actual cooking vat. The technical expenditure which such vacuum boiling facilities entail is relatively substantial. In these processes, all additives are admixed with the fruit in a liquid form.

Since, in the known vacuum methods for the manufacture of jams and marmalades, pectins are added in a swelled or dissolved form and the fruit acid is also added in the form of a solution, all these solutions enter into the total product. In the end the result is a high water content and the high water components have to be evaporated. It is advantageous in the inspissation process carried out in the vacuum cooking vat that the heating be effected at temperatures of approximately 70° C., whereas one has to put up with the drawback that an evaporation of the flavor takes place so that a finished product having a poor flavor content is obtained. That is why boiling installations with flavor recovery facilities are also known in which the volatile flavor components are condensed from the water vapors and added to the boiled material again prior to the preparation being discharged. However, boiling installations of this type are very expensive.

Moreover the quality of the finished product deteriorates it less sugar is present in the product during the boiling down operation itself. Also in vacuum boiling it was realized that the high sugar content is advantageous for conserving the flavor. This is why the boiling down is effected at a low temperature, which, however, again leads to flavor losses.

According to the aforedescribed processes and methods, in particular when jams are produced under vacuum, pectins dissolved in water are used by the industry for the gelatinization of the products. In addition, also on account of economical considerations, crystallized sugar is substituted for glucose syrup and, by this step, further water components are carried into the charged product. Glucose syrup contains only 80% dry matter and 20% water. The undesirable increase of the water content in the charged product—fruit, sugar and glucose syrup—inclusive of the pectin solution can, according to the known methods and for economical reasons, not be avoided. With an additional expenditure of energy, the water content of the pectin solution and of the glucose syrup are then evaporated once more when the jams are manufactured and, in the process, flavors are inevitably lost. It is intended that facilities for flavor recovery and flavoring agent additions will subsequently compensate the flavor losses incurred.

SUMMARY OF THE INVENTION

The present invention is based on the technical problem of providing a method for the manufacture of pectinous and sacchariferous preparations, more particularly from fresh fruit or fruit which has been kept fresh and which is stoned or deseeded or cored, fruit flesh, fruit pulps or fruit purees or pastes, such as jam, marmalade or the like, by means of which the water content in the charged product is reduced. It is furthermore an object of the invention to dissolve powdered pectins under the most widely varying conditions, such as in the presence of a high sugar content, in the exclusive presence of fruit, in the presence of an additional pressure at temperatures below or above 100° C. in such a way that unboiled jams and marmalades as it were can be produced which are capable of being stored for several years without any growth of mold and with the conservation of the flavor.

DESCRIPTION OF THE INVENTION

The technical problem posed is solved in a method of the kind described in the beginning in that a component B of fruit and glucose syrup is removed from the charged product of fruit, glucose syrup and crystallized sugar which, in comparison with the total quantity A of charged products, is smaller and is boiled down separately; then the remaining component C of the charged products from the larger percentage component A of fruit and sugar is mixed with powdered pectin and, depending on the solubility of the pectins, the components B and C are intermixed, variably charged and heated under pressure to from 95° C. to 110° C. and, subsequent to the addition of an acid at gelatinization temperature, the finished product is filled into glass jars or the like, or in that, from the charged products of fruit, glucose syrup and crystallized sugar, a component B of fruit and glucose syrup is removed which, in comparison with the total quantity A of charged products, is smaller and this is boiled down separately, then the remaining component C of the charged products from the larger percentage A of fruit and sugar is mixed with aqueous pectin and, depending on the solubility of the pectins, the components B and C are intermixed, variably charged and heated under a vacuum without any pressure to from 95° C. to 110° C. and, subsequent to the addition of an acid at gelatinization temperature, the finished product is filled into glass jars ot the like, in which case an additional fruit component is added to the component due to be boiled down separately prior to the concentration by evaporation.

It is true that, in the method according to the invention, on account of the separate inspissation of a component of the total quantity of fruit charged together with the component of glucose syrup, approximately 5% of the flavor components are destroyed, on the other hand, approximately 40% flavor components remain preserved completely because the bulk of the fruit is not substantially deleteriously affected by the brief supply of hot air or in the vacuum when the solids are standardized, so that the full flavor is preserved to an extent of a far greater percentage than when the total quantity of fruit (e.g. 45%) is heated with the glucose syrup (10%) and the crystallized sugar (45%) under pressure in a closed cooking vat; for in this case, larger quantities of water vapor are generated which, by means of the introduction of hot air, has to be eliminated in ever increasing periods of time. The separate inspissation is not only possible by using 80% glucose syrup or, when diet jam is produced, in the form of 70% fructose, or, when no glucose syrup is charged or permitted to be charged, an 80% saccharine solution is charged which may also be employed up to 20% more in the form of a charged product. As further charged products, inverted sugar solutions and isoglucose solution are used.

The economic advantage of this method consists additionally in that glucose syrup is less expensive than sugar.

In the case where powdered pectins are employed, the heating is effected under pressure. If, on the other hand, aqueous pectins are used, the heating takes place for a brief spell under vacuum without pressure. In this case the proportion of fruit of the component to be boiled down separately is increased by from 1% to 3%. In all cases the pectin is not added to be boiled down separately.

DETAILED DESCRIPTION OF THE PREFERRED METHOD

A method is of advantage according to which a) a component of 5% fruit and 10% glucose syrup is removed from a first charge of 45% fruit, 10% glucose syrup and 45% crystallized sugar;

b) the second charge of 5% fruit and 10% glucose syrup is boiled down in a cooking vat while subject to a loss of flavor;

c) in a separate, closed cooking vat, the component which remains from the first charge of 40% fruit and 0 to 45% crystallized sugar with 0.3% powdered pectin is heated under pressure to from approximately 90° C. to 100° C., the boiled-down product is maintained at this temperature for approximately 5 minutes;

d) the hot boiled-down product obtained from the second charge is added to the product from the first charge with the remaining components, the two intermixed boiled-down products are heated to pasteurization temperature, and e) after having cooled to from 85° C. to 75° C., the obtained finished product is filled into jars or the like.

As a first step, only powdered pectin is still employed for the gelatinization which, under pressure, dissolves so as to form sacchariferous preparations. As a second step, according to the invention, the entire evaporation of water which results from the excess water of the fruit and from the glucose syrup, is carried out separately over a small component of the charged fruit and the glucose syrup, in connection with which the destruction of a small percentage of the flavor components is accepted in order to obtain a high percentage of flavor components.

According to the invention the procedure according to this is that

| | |
|---|---|
| a) from the charged products of | 45% fruit |
| | 5% glucose syrup |
| | 50% crystallized sugar, |
| b) a component of | 5% fruit and |
| | 5% glucose syrup |
| is removed and boiled down separately, | |
| c) the remaining charged products of | 40% fruit |

45% sugar are intermixed with powdered pectin and, in dependence of the solubility of the pectins, the components from b) and c) are variably charged and heated under pressure to from 95° C. to 110° C. Subsequent to the addition of acid at gelatinization temperature, the filling into receptacles takes place.

In the method described, the fine standardization of the predetermined dry substance is carried out with the aid of hot air that is passed across the surface of the product or which takes place with a vacuum. If, on the other hand, aqueous pectin is employed, then the heating is effected in a vacuum without pressure. It will then be necessary to give the component to be boiled down separately a higher proportion of fruit in comparison with the fruit proportion that is provided in the concentration by evaporation with powdered pectins, in which case the extra proportion may amount to from 1% to 3% and, if necessary, can also be higher. The aqueous pectins in question are pectin solutions.

For the proportions of fruit and glucose syrup according to step b), by way of example, in the various ratios subsequent to the concentration by evaporation, the following consistencies result:

Glucose syrup

The ratio 1:1 = after the inspissation: vicous Liquid at approx. 100° C.
The ratio 1:0.5 = at approximately 100° C.: highly viscous
The ratio 1:2 = at approximately 100° C.: Liquid
The ratio 1:3 = at approximately 100° C.: almost Like glucose syrup at 80° C.

It is particularly advantageous in the methods according to the invention that, even at a zero sugar content, the powdered pectins can be introduced into and heated in a closed cooking vat. The dissolution of the powdered pectins takes place e.g. already at a pressure of below 0.3 bar at temperatures of between 40° C. to 50° C. The powdered pectins are thus dissolved without the flavor being detrimentally effected thereby. In this connection it is essential that the dissolution of the powdered pectins can be carried out while losses by water vapor are avoided, something which is possible only in a closed system. Besides the introduction of compressed air and an excess pressure of from 0.6 to 0.8 bar it is also possible not to employ an external pressure supply for an excess pressure of from 0.6 to 0.8 bar when the temperature is increased up to approximately 95° C.

It is also possible to achieve a higher pressure by a rise in temperature.

Powdered pectins are thus soluble also in the case where high sugar contents are present, e.g. by reduction of the fruit component with or without any supply of pressure. A sugar compensation with a simultaneous flavor conservation has not been realizable up to now with the known methods. There is no objection to a subsequent addition of sieved or strained fruit.

Consequently it is also possible for a proportion of the fruit, when high sugar contents are present, e.g. between 70% and 80%, to be heated with pressure within temperature ranges of below or above 100° C. The legally prescribed fruit components are subsequently added in a strained or sieved state and are pressure-treated once more together with the powdered pectins.

Saccharine solutions are employed; the use of crystallized sugar is also possible. The pectin is used in the form of powdered pectin and also the fruit acids are added in a crystalline form so that no additional water components are added and the total water content is predetermined by the water content of the fruit. It is especially advantageous in this method that, prior to the pressure stage, already a high excess content of sugar or the total sugar is added to the fruit. The more sugar is present in the pressure stage, the better the finished product will be. It has surprisingly been shown that the powdered pectins which are used are dissolved completely in the pressure stage. This is achieved even when the entire sugar has been added prior to the pressure stage and the solids of the finished product are standardized. The pressure stage is particularly suitable for compensating the low sugar concentration in the fruit and the high sugar concentration in the vicinity of the fruit. Through this step the floating of the fruit in the finished product is prevented. The better and more rapid dissolution of the pectins is achieved with the multistage method. What is essential is that, in the pressure stage, the hitherto "pretreated" pectins are completely dissolved. With the method it is thus possible to make use of powdered pectins and to achieve their complete dissolution in the pressure stage. It is precisely due to the high sugar content that an increase in quality in the finished product with high flavor content has surprisingly resulted. Compared with the known methods, evaporation and heating is likewise carried out in the method according to the invention, but in the presence of a high sugar concentration. In addition, the pectins are dissolved at a higher temperature without the presence of water. According to this, powdered pectins can be dissolved in the presence of high sugar concentrations. In this case the flavor content is augmented. Thus, inter alia, according to the method as per the invention, jams of baking quality and jams for yogurt-and-fruit preparations can be manufactured. It is possible to employ the method wherever powdered pectins are to be dissolved in the presence of a high sugar content. Thus, inter alia, also where gelatins derived from pectin are produced in the presence of sugar, such as pectin products that are identical with agar gel confectionery and candies in which, in lieu of agar gel, pectin is employed as gelatinization agent.

All methods result in finished products that possess a very high flavor content.

In the method wherein in the first boiling-down phase of the charged quantity of fruit, a mixture of powdered pectin and crystallized sugar is added, only a very small percentage of sugar of the total quantity of sugar used is charged to begin with. Due to the subsequent heating in a closed cooking vat, the powdered pectin dissolves completely even if only a small quantity of sugar is charged. The subsequent addition of the remaining quantity of sugar retains the flavor. An insignificant loss of flavor in this method can be compensated by the addition of flavoring agents. From risen and concentrated water vapors thus obtained flavor can be made use of. It is furthermore possible, instead of a dissolution of the powdered pectins in the presence of a high sugar content at a temperature in excess of 100° C. in a closed cooking vat under pressure, to effect the dissolution of the powdered pectins at a temperature below 100° C., in particular by means of an additional pressure created by supplying a neutral gas, such as e.g. nitrogen gas.

The methods offer qualitative and economical advantages; they result in a clear improvement of the flavor. At the same time, with respect to present-day technology, they constitute a simplification and lead to a substantial saving of energy. A further advantage resides in that, conventional processes-open boiling down-can be adapted or converted without any problem. The effort relating to the equipment is a very simple one and easy to realize. The methods supersede the expensive vacuum technique in the manufacture of high-quality products. The improvement in the flavor and the reduction of the energy requirement are achieved because only powdered pectins are employed which dissolve without difficulty under pressure. The dissolution also takes place in the presence of higher sugar concentrations. It was possible to prove in tests that powdered pectins and substitute products in the fruit yogurt manufacture such as starch and gelatins dissolve readily at pressures below 1 bar and at temperatures below 100° C. The requisite pressure can be supplied from the outside or it is created during the heating in the closed container. In a further process stage it is possible to standardize the products at temperatures below 100° C. with the aid of a hot air blower to the predetermined sugar content. This blower supplies sterile hot air which is passed across the surface of the product and eliminates the excessive water vapor at the same time.

Unboiled or uncooked jams, as it were, are produced with this method. Aqueous pectine solutions are not made use of for the gelatinization of the products. This measure provides an optimal protection for steam-volatile flavor components and reduces the energy requirement to a minimum.

A further advantage inherent in the method can be exploited for the pasteurization of the products. Subsequent to the standardization of the sugar content at below 100° C., the products can be treated under pressure at a temperature in excess of 100° C. It is possible to thereby shorten the pasteurization processes and the necessity of pertinent techniques is called into question. In connection with higher pasteurization temperatures it is also possible to aim at higher filling temperatures. Here the employment of suitable pectins or pectin mixtures plays a decisive part. In tests involving heating temperatures in excess of 100° C., jam was filled into receptacles even at temperatures of from 90° C. to 95° C. It proved possible to control and prevent the floating of the fruit by means of the lumpiness of the finished product. Under method conditions—dissolution of the pectins under pressure and standardization of the dry substance flavor losses and variations in quality and manufacturing temperatures of between 90° C. to 100° C. and within the range of 100° C. to 107° C. could be perceived.

The methods result in defoamed products which actually are turbid to clear and of good consistency and which possess a very good flavor.

In addition, according to this method, higher yields are obtained which lie approximately 3.5% above the known yields so that it is also possible to additionally reduce the manufacturing costs.

The method according to the invention is explained in greater detail with the aid of the following examples of jam manufacture.

The method is based on the use of fresh fruit or fruit which has been kept fresh, i.e., deseeded or stoned fruit, fruit flesh and the like. It is also possible to use deep-frozen fruit or fruit pulps or fruit puree. Depending on the variety or varieties of fruit, single-fruit or multifruit jams and mixed jams can be produced. The concentration and evaporation by boiling is effected in a cooking vat constructed in a manner known per se.

EXAMPLE 1

In an open cooking vat, to a predetermined quantity of fruit, the total charged quantity of crystallized sugar and an anti-foaming agent are added. This fruit-and-sugar mixture is heated to 60° C. to 80° C., by preference to 70° C. Following the termination of the heating process, the powdered pectin is added and the mixture of fruit and sugar and powdered pectin is heated to 90° C. Following this, glucose syrup is added and the fruit-and-sugar mixture is continued to be heated at 90° C. Practically no cooling takes place when the glucose syrup is added. Water vapors which arise in the process are drawn off or a concentration is effected by air being blown onto the surface of the fruit-and-sugar mixture at from 80° C. to 90° C. The total product thus obtained is hereupon heated with the cooking vat closed to from 90° C. to 110° C., by preference to 105° C., whereby a bubbling or ebullition of the total product is avoided. The cooking chamber is then pressure-relieved by discontinuation of the pressure by maintaining a heating temperature of approximately 100° C. to 95° C. Citric acid is then added as fruit acid. The thus obtained total product is continued to be heated in the open cooking vat at temperatures ranging from 70° C. to 95° C. while the sugar content is standardized at the same time. Then follows the cooling of the finished product at 75° C. to 80° C. The obtained finished product is filled into jars or otherwise constructed receptacles. During the manufacturing process the respective sugar content is determined by refractometric means.

Charged in this method are 45 kg fruit, 51 kg crystallized sugar as well as defoaming agent. Of powdered pectin, 0.3 to 0.5 kg are charged. The quantity of citric acid added amounts to approximately 0.2 to 0.3 kg. Added further are 5 kg of 80% glucose syrup.

EXAMPLE 2

In an open cooking vat a predetermined quantity of fruit together with a mixture of sugar and powdered pectin composed of one part powdered pectin and fifteen parts sugar is heated to 70° C. In comparison with the total quantity of fruit charged the quantity of charged crystallized sugar here is exceedingly small; it should amount to from approximately 2% to 10%. Following this the open cooking vat is closed and the mixture of fruit, sugar and powdered pectin is heated for approximately seven minutes to from 85° C. to 90° C. In this process a pressure is generated which is mainly due to heated air. In this method the powdered pectins are heated while water vapor is avoided. Hereupon the remaining quantity of crystallized sugar to which glucose syrup is added, is charged, the temperature in the cooking vat drops in this case from approximately 85° C. to approximately 60° C. By the establishment of a vacuum or by means of a hot air blower, steam is allowed to evaporate. Following this, an uncooked jam is obtained. In this method, 45 kg fruit (dry substance), 51 kg crystallized sugar, defoaming agent, 5 kg glucose syrup (80%), 0.3 to 0.5 kg powdered pectin and 0.2 to 0.3 kg citric acid as fruit acid are charged. In the first phase of this method, approximately 1 kg of the total quantity of crystallized sugar charged is intermixed with the powdered pectin and added to the total predetermined quantity of fruit.

EXAMPLE 3

In order to dissolve powdered pectins at a temperature below 100° C. under pressure in saccharine solutions, the following procedure is adopted:

| a) 45% fruit | 1000 g |
|---|---|
| b) 21% crystallized sugar | 466.5 g |
| c) 4.5% crystallized sugar | 100 g |
| d) 0.3 parts powdered pectin | 7 g |
| e) 25.5% crystallized sugar | 566.5 g |
| f) 4% glucose syrup | 89 g to 111 g (80%) |

The components a) and b) are heated to 70° C. in an open cooking vat. Following this the components c) and d) are stirred in. The cooking vat is closed and compressed air is introduced. An excess pressure of 0.6 to 0.8 bar is created as temperature is increased to 90° C. Within the range of from 70° C. to 90° C., the excess pressure is maintained for four minutes, in which case the pressure was applied only during the heating period. After relieving the excess pressure, the cooking vat is opened and the components e) and f) are added. Hereupon the dry substance is standarized with a hot air blower to 62%. The total charge is heated to 95° C. and 0.3 parts (=7 g) citric acid are stirred in and the total mixture is cooled to 75° C. and then filled into receptacles in a manner known per se.

According to this method a very good gelatinization of the product is achieved. Subsequent to the pressure heating it was possible to perceive the dissolution of the pectins by the "smoothness" of the mixture. It was surprising that it is possible to dissolve powdered pectins at a temperature of 100° C. under pressure in saccharine solutions. Also in the case where higher sugar contents of up to 50% are involved, a dissolution of the powdered pectins is possible. While in the preceding example 1133 g crystallized sugar had been charged, the possibility also exists of setting out from larger quantities of sugar, in which connection it is advantageous when the components b), c) and e) are added at a ratio of 21%: 4.5%: 25.5%; however, also changed ratio figures may apply. The finished product possesses a high flavor content.

EXAMPLE 4

In order to dissolve the powdered pectins when a high sugar content is present, the following procedure was adopted:

| a) 45% fruit | 1000 g |
|---|---|
| b) 46.5% crystallized sugar | 1033 g |
| c) 4.5% crystallized sugar | 100 g |
| d) 0.3 parts powdered pectin | 7 g |
| e) 4% glucose syrup | 89 g to 111 g (80%) |

The components a) b) and e) are heated in an open cooking vat to 70° C. Thereafter the components c) and d) are stirred in. The cooking vat is sealed and compressed air is introduced. An excess pressure of from 0.6 to 0.8 bar as temperature increases to approximately 95° C. is created. The excess pressure is maintained for five minutes within the temperature range of 70° C. to 95° C. The excess pressure was maintained only during the heating phase. Following this, the excess pressure is discontinued, the cooking vat opened and the standardization of the dry substance is effected with the aid of a hot air blower. Under further heating the temperature drops during the standardization phase to 90° C. Following this the addition of acid takes place in the form of 0.3 parts (=7 g) and the cooling to gelatinization temperature of 75° C., whereupon the filling into receptacles is carried out.

Despite a maximal addition of sugar, a good gelatinization was achieved. The product obtained is free from bubbles and has a good gloss. It is possible to reduce the quantity of charged powdered pectin without the gelatinization being adversely affected hereby. The good solubility of the powdered pectins in the presence of a full sugar charge is achieved only by the application of pressure at the manufacturing temperatures of below 100° C. The finished product has a high flavor content.

EXAMPLE 5

In order to dissolve the powdered pectins at temperatures below 100° C. when being heated in a closed cooking vat in a mixture of sugar and fruit, even in the presence of sugar contents of approximately 60%, while employing the below-listed proportions of the individual components, the following procedure was adopted:

| a) 45% fruit | 1000 g |
|---|---|
| b) 46.5% sugar | 1033 g |
| e) 4% glucose syrup | 89 g = 111 g (80%) |
| c) 4.5% sugar | 100 g |
| d) 0.3 parts powdered pectin | 7 g. |

All the mixture components (a+b+e and c+d) are intermixed at ambient temperature. The cooking vat constructed in the form of a pressure vessel is closed and the mixture components heated to 95° C. After reaching the temperature, the pressure is relieved and the cooking vat opened. The predetermined dry substance is standardized with the aid of a hot air blower. Following the addition of the acid, the cooling to gelatinization temperature takes place.

PRESSURE CONDITIONS/DURATION OF HEATING

Test 1: Heating and adjustment of the excess pressure to a constant 0.3 bar.
Heating duration: 12 minutes.
Test 2: Heating and pressure adjustment as in Test 1.
Heating duration: 20 minutes
Test 3: Heating and pressure increase to 0.9 bar.
Heating duration: 13 minutes.

DISSOLUTION OF THE PECTINS WHEN THE DRY SUBSTANCE IS STANDARDIZED TO 62.5%

Test 1: Soft gelation, fruits do not float. Pectins are not completely dissolved.
Test 2: Firm gelation.
Test 3: Firm gelation.

TEST RESULTS

Powdered pectins are dissolved during the heating to temperatures below 100° C. in the pressure vessel even in the presence of high sugar contents. The dissolution of the pectins is timedependent. By increasing the pressure it is possible to accelerate the dissolution of the pectins. The dissolution of the pectins does not call for any external pressure supply by means of gases, such as nitrogen or compressed air.

When the sugar mixture is heated, a partial pressure by the water vapor is created in accordance with the composition of the mixture—in this case approximately 40%—and the heating of the air in the pressure vessel. When heating to approximately 95° C., the resulting pressure is approximately 0.9 bar excess pressure and is very largely independent of the size of the pressure vessel. The results obtained without a supply of pressure comprise also of necessity the better solubility of the pectins, just when as the pressure is supplied.

Accordingly the dissolution of the powdered pectins takes place at heating temperatures of less than 100° C. within ranges of from 0.3 bar to 0.9 bar or even up to 1.3 bar; in the latter case it is necessary to supply pressure. The sugar exchange between the fruit and the vicinity of the same is influenced time-wise, which, when the fruit is distributed in a lumpy manner in the mass, results in shorter production times.

EXAMPLE 6

From a first charge of 45% fruit, 10% glucose syrup and 45% crystallized sugar, a component of 5% fruit and 10% glucose syrup is removed. The 5% fruit and 10% glucose syrup (ratio 1:2) are concentrated by being boiled down in the form of a second charge while incurring a flavor loss in a closed cooking vat under vacuum or in an open cooking vat. The component of 40% fruit and 45% sugar which remains in the first charge is heated separately under pressure in a closed cooking vat, subsequent to a component of 0.3% powdered pectin having been added to the same. The heating is continued until approximately 95° C. have been reached. The product being boiled down is maintained at this temperature for approximately 5 minutes, the cooking vat is then opened. Now 0.2 to 0.3 parts citric acid is added and the hot product being boiled down obtained from the second charge is added to the product being boiled down from the first charge decreased by the component removed therefrom: it is then allowed to cool to a gelatinization temperature of 75° C. and the finished product is filled into jars. It is however also possible to proceed in this case in such a way that sugar and fruit are incorporated into the inspissated glucose and fruit mixture and they are then treated under pressure together with pectin, the fine standardization of the dry substance then being effected with the aid of hot air and/or a vacuum.

It is also possible to employ in an analogous manner the methods specified in the Examples 1 thru 5, but always on the condition that a component of fruit is removed from the total quantity of fruit and is boiled down separately with glucose syrup, while the main component of fruit is heated together with the crystallized sugar and the pectin.

In those cases where powdered pectins are employed, heating takes place under pressure. If, on the other hand, aqueous pectins are used, then heating is carried out briefly under vacuum without any pressure. In this case the proportion of fruit in the component to be boiled down separately is increased by from 1% to 3%. In all cases the pectin is not added to the component which is to be boiled down separately.

The method step according to the invention can be made use of both in the vacuum process as well as in the process where the operation is performed under pressure. This applies to both the inspissation of the main component as well as to the separated component. It is also possible to add the pectins after the intermixing of the boiled-down separate component and the main component. The methods described in the Examples 1 thru 5 may then follow after both components have been intermixed. The charge consisting of fruit and sugar does not have to be heated separately prior to the boiled-down component being returned.

EXAMPLE 6A

| From a first charge of | 45% fruit |
| | 20% glucose syrup |
| | 35% sugar, |
| a component A of | 7% fruit |
| | 20% glucose syrup |
| is removed and boiled down separately in a second | |
| charge under vacuum or in an open cooking vat. | |
| The remaining component B | 38% fruit |
| of the first charge of | 35% sugar | inclusive of 0.3% powdered pectin is heated under pressure to from 95° C. to 105° C. After cooling and the opening of the cooking vat, the total components A and B are intermixed. For the pH standardization, 0.2%–0.3% citric acid are incorporated. The fine standardization of the predetermined dry substance is effected by introducing hot air or by a brief vacuum. The product is allowed to cool to gelatinization temperature and then filled into receptacles.

EXAMPLE 7

| Jam Manufacture | | | | |
|---|---|---|---|---|
| Charge products: | Raspberries-12 Brix | | | 997.0 g |
| | Sugar | | | 947.0 g |
| | Glucose syrup (80%) | | | 345.0 g |
| | Pectin | | | 4.4 g |
| | Citric acid | | | 5.6 g |
| | | | | 2,299.0 g |
| Dry substance: | Raspberries | | | 119.6 g |
| | Sugar | | | 947.0 g |
| | Glucose syrup | | | 276.0 g |
| | Pectin | | | 4.4 g |
| | Citric acid | | | 5.6 g |
| | | | | 1,352.6 g |
| Test Performance | | | | |
| A) Boiling down: | Raspberries | | | 107.0 g |
| | Glucose syrup | | | 345.0 g |
| | | | | 452.0 g |
| | Water evaporation ./. | | | 72.0 g |
| | 105° C., 4 min. | | | 380.0 g |
| B) | Raspberries | | | 890.0 g |
| | Sugar | | | 215.0 g |
| | Pectin | | 4.4 g | |
| | Sugar | | 100.0 g | 104.4 g |
| | | | | 1,209.4 g |
| Component B is incorporated into Component A: | | | | |
| | Component A | 380.0 g | | |
| | Component B | 1,209.4 g | | 1.589.4 g |
| Heating: | Mixture A + B | 715.0 g | | Dry Matter = 45% |
| | Mixture A + B | 60° C. | | |
| | Mixture A + B | 90° C., 3 min. | | |
| C) | Addition of sugar | | | 632.0 g |
| Heating: | Mixture A + B + C | 1,347.0 g | | Dry Matter = 60.6% |
| | Mixture A + B + C | 70° C. | | |
| | Mixture A + B + C | 95° C., 5 min. | | |
| Pressure stage: | Mixture A + B + C | 95° C., 5 min. 0.9 bar | | |
| D) | Addition of acid | | | |

-continued

| Mixture | 1,352.6 g | Dry Matter = 60.7% |
|---|---|---|
| A + B + C−D | 95° C. | |
| Cooling: | 80° C. | |
| Filling: | 80° C. | 2,227.0 g |
| Water vapor losses B thru D | | 20.0 g |
| Finished Product: Refractometer Value | | 63.4% |
| Yield/Weighed analytical product | | 2,207.0 g |
| Theoretical Yield: Refractometer Value | | 63.4% |
| Dry Substance | | 1,352.6 g |
| Yield | | 2.133.0 g |

What is claimed is:

1. A method for the manufacture of pectinous and sacchariferous preparations such as jam and marmalade, particularly from fresh fruit or fruit that has been kept fresh and which is stoned, deseeded or cored, fruit flesh, fruit pulps, fruit purees and pastes, comprising:
   providing a first charge of products of fruit, glucose syrup and crystallized sugar in a total quantity A,
   removing a component of fruit and glucose syrup from the first charge in a minor quantity compared to the total quantity A to provide a second charge B containing the removed component of fruit and glucose syrup and component C containing the remainder of the first charge,
   separately boiling down the second charge B containing fruit and glucose syrup removed from the first charge, then
   mixing powdered pectin with component C,
   mixing second charge B and component C containing the remainder of the first charge,
   heating the mixture of second charge B, component C and pectin under pressure at a temperature of from 95° C. to 110° C. in dependence of the solubility of the pectin,
   adding acid at gelatinization temperature of the mixture to obtain a product and then
   placing the resulting product into receptacles.

2. A method for the manufacture of pectinous and sacchariferous preparations such as jam and marmalade, particularly from fresh fruit or fruit that has been kept fresh and which is stoned, deseeded or cored, fruit flesh, fruit pulps, fruit purees and pastes, comprising:
   providing a first charge of products of fruit, glucose syrup and crystallized sugar in a total quantity A,
   removing a component of fruit and glucose syrup from the first charge in a minor quantity compared to the total quantity A to provide a second charge B containing the removed component of fruit and glucose syrup and component C containing the remainder of the first charge,
   adding a further proportion of fruit to the second charge B,
   separately boiling down second charge B containing fruit, glucose syrup and the further proportion of fruit, then
   mixing aqueous pectin with component C,
   mixing second charge B and component C containing the remainder of the first charge,
   heating the mixture of second charge B, component C and pectin under vacuum without supplying any pressure at a temperature of from 95° C. to 110° C.,
   adding acid at gelatinization temperature of the mixture to obtain a product and
   placing the resulting product in receptacles.

3. The method according to claim 1 or 2, in which the first charge contains 45-50% of fruit, 5-20% of glucose syrup and 35-50% of crystallized sugar and a component containing 5-7% of the fruit and glucose syrup in an amount of about 0.5 to about 3.2 parts per part of fruit is removed from the first charge to provide second charge B.

4. The method according to claim 1, in which:
   the first charge contains 45% fruit, 10% glucose syrup and 45% crystallized sugar;
   a component of 5% fruit and 10% glucose syrup is removed from the first charge to provide second charge B;
   second charge B is boiled down in a cooking vat while incurring a flavor loss;
   component C is combined with 0.3% powdered pectin;
   in a separate closed cooking vat, component C containing pectin is heated under pressure to about 95° C. to 100° C. and maintained at this temperature for about 5 minutes; then
   the product obtained from boiling down second charge B is added to the component C and the resultant mixture is heated to pasteurization temperature and
   after cooling to about 75° C. to 85° C., the product obtained is placed in receptacles.

5. The method of claim 1, in which:
   the first charge contains 45% fruit, 5% glucose syrup and 50% crystallized sugar;
   a component of 5% fruit and 5% glucose syrup is removed from the first charge to provide second charge B which is boiled down separately;
   component C which contains the remainder of the first charge is mixed with powdered pectin;
   second charge B which has been boiled down is mixed with component C which contains pectin and the resultant mixture is heated under pressure from 95° C. to 110° C.; and
   subsequent to the addition of acid at gelatinization temperature, the resultant product is filled into receptacles, while the fine standardization of the predetermined dry substance is effected with the aid of hot air passed across the surface of the product or by means of a vacuum.

6. A method for the manufacture of pectinous and sacchariferous preparations such as jam and marmalade, particularly from fresh fruit or fruit that has been kept fresh and which is stoned, deseeded or cored, fruit flesh, fruit pulps, fruit purees and pastes, comprising:
   providing a first charge of products of fruit, glucose syrup and crystallized sugar in a total quantity A,
   removing a component of fruit and glucose syrup from the first charge in a minor quantity compared to the total quantity A to provide a second charge B containing the removed component of fruit and glucose syrup and component C containing the remainder of the first charge,
   separately boiling down the second charge B containing fruit and glucose syrup removed from the first charge, then
   mixing component C with powdered pectin or with aqueous pectin,
   heating the mixture to 95° C. to 105° C. under pressure when
   component C is mixed with powdered pectin and under vacuum when component C is mixed with aqueous pectin, then after cooling, intermixing second charge B which has been boiled down with component C which has been heated with pectin, incorporating citric acid in the resultant mixture for pH standardization and placing the resultant product in receptacles.

7. The method of claim 6, in which the first charge contains 45% fruit, 20% glucose syrup and 35% crystallized sugar, a component of 7% fruit and 20% glucose is removed from the first charge to provide second charge B and 0.2 to 3 parts citric acid is incorporated for pH standardization and the further step of effecting fine standardization of the predetermined dry substance by the introduction of hot air or by means of a vacuum.

8. The method according to claim 1, 4, 5, 6 or 7, wherein powdered pectin is combined with component C and the mixture of powdered pectin and component C is subjected to heat and an external supply of compressed air to dissolve the powdered pectin in a closed system.

9. The method according to claim 6, which further comprises:

stage a, comprising removing a portion of crystallized sugar from component C such that the quantity of crystallized sugar mixed with fruit in the remainder of component C corresponds to about 2% to 10% of the total quantity of sugar contained initially in the first charge, combining the remainder of component C with powdered pectin in an amount of one part of powdered pectin per fifteen parts of sugar and heating the resulting mixture to about 70° C. in an open cooking vat;

stage b, comprising heating the resulting mixture in a closed cooking vat for about seven minutes to a temperature of from 85° C. to 90° C.;

stage c, comprising adding the portion of crystallized sugar removed from component C to the mixture which has been heated, causing the temperature inside the cooking vat to drop from 85° C. to 60° C. and causing a vacuum and stage d, comprising by the establishment of a vacuum, exhausting steam from the resultant mixture with the aid of a hot air blower.

10. The method of claim 9, and the further steps comprising removing a further portion of glucose syrup from the initial charge and adding the removed portion of glucose syrup to the mixture in stage c, adding antifoaming agent to the remainder of component C in stage a, adding citric acid to the mixture in stage c and while carrying out the method, refractometrically determining the respective sugar content of the mixtures.

11. The method of claim 10 in which in stage a the resulting mixture contains 45 kg of fruit, 1 kg of crystallized sugar, antifoaming agent and 0.3 to 0.5 kg of powdered pectin and in stage c, 50 kg of crystallized sugar, 5 kg of 80% glucose syrup and 0.2 to 0.3 kg of citric acid are added to the mixture which as been heated.

12. The method according to claim 1, 4, 6 or 7 in which powdered pectin is mixed with component C and the further step of carrying out the dissolution of the pectin at a temperature below 100° C. by means of additional pressure generated by supplying a neutral gas to the mixture.

13. The method according to claim 1, which further comprises removing crystallized sugar and additional glucose from the component C so that remaining component C contains 45% fruit and 21% crystallized sugar, heating remaining component C briefly to 70° C. in an open cooking vat, then adding 4.5% crystallized sugar and 0.3 parts of powdered pectin to the remaining component C and closing the cooking vat, introducing compressed air into the interior of the closed cooking vat to provide an excess pressure of from 0.6 to 0.8 bar while simultaneously increasing the temperature to 90° C., maintaining the mixture in the closed cooking vat under pressure at a temperature of 70° C. to 90° C. for about four minutes, the excess pressure being maintained only during the heating phase and then discontinued, opening the cooking vat and adding 25.5% crystallized sugar and 4% glucose syrup to the resulting mixture, while effecting standardization of the dry substance to 62% with the aid of a hot air blower, heating the total charge to 95° C.;

adding 7 g of citric acid to the total charge to obtain a product which is allowed to cool to 75° C., and placing the product in receptacles.

14. The method according to claim 6, wherein component C contains 45% fruit, 46.5% crystallized sugar and 4% glucose syrup and which further comprises:

heating component C to 70° C. in an open cooking vat, mixing 4.5% crystallized sugar and 0.3 parts of powdered pectin with heated component C in the open cooking vat, closing the cooking vat and introducing compressed air into the interior of the cooking vat to produce an excess pressure of from 0.6 to 0.8 bar while simultaneously increasing the temperature to about 95° C., maintaining the mixture at excess pressure for about five minutes, the excess pressure being maintained only while the mixture is being heated, after which the excess pressure is discontinued and opening the cooking vat and standardizing the dry substance with the aid of a hot air blower.

15. The method according to claim 1, 4, 5, 6 or 7 wherein component C contains 45% fruit and 21% crystallized sugar and which further comprises:

heating component C briefly to 70° C. in a closed cooking vat, mixing 4.5% crystallized sugar and 0.3% powdered pectin with component C in the closed cooking vat, maintaining the resulting mixture in the closed cooking vat at from 70° C. to 90° C. for about four minutes, opening the cooking vat and then adding 25.5% crystallized sugar and 4% glucose syrup to the mixture in the cooking vat while effecting standardization of the dry substance to 62% by means of a hot air blower, heating the entire mixture to 95° C., adding 0.2 to 0.3 parts citric acid to the mixture to obtain a product which is allowed to cool to 75° C., and placing the product in receptacles.

16. The method according to claim 1, 4, 5, 6 or 7, wherein component C contains 45% fruit, 46.5% crystallized sugar and 4% glucose syrup and which further comprises:

heating component C to 70° C. in a closed cooking vat, mixing 4.5% crystallized sugar and 0.3 parts of powdered pectin with component C, heating the resultant mixture in the closed cooking vat to about 95° C. and maintaining this temperature for about 5 minutes, opening the cooking vat and effecting standardization of the dry substance with the aid of a hot air blower while maintaining the mixture at a temperature of about 90° C.;

adding 7 g of citric acid to the charge and cooling it to gelatinization temperature to obtain a product, and placing the product in receptacles.

* * * * *